Jan. 18, 1949.  F. F. ROTH, JR  2,459,183
FIXTURE FOR HARDENING DIES
Filed Oct. 1, 1946  5 Sheets-Sheet 2

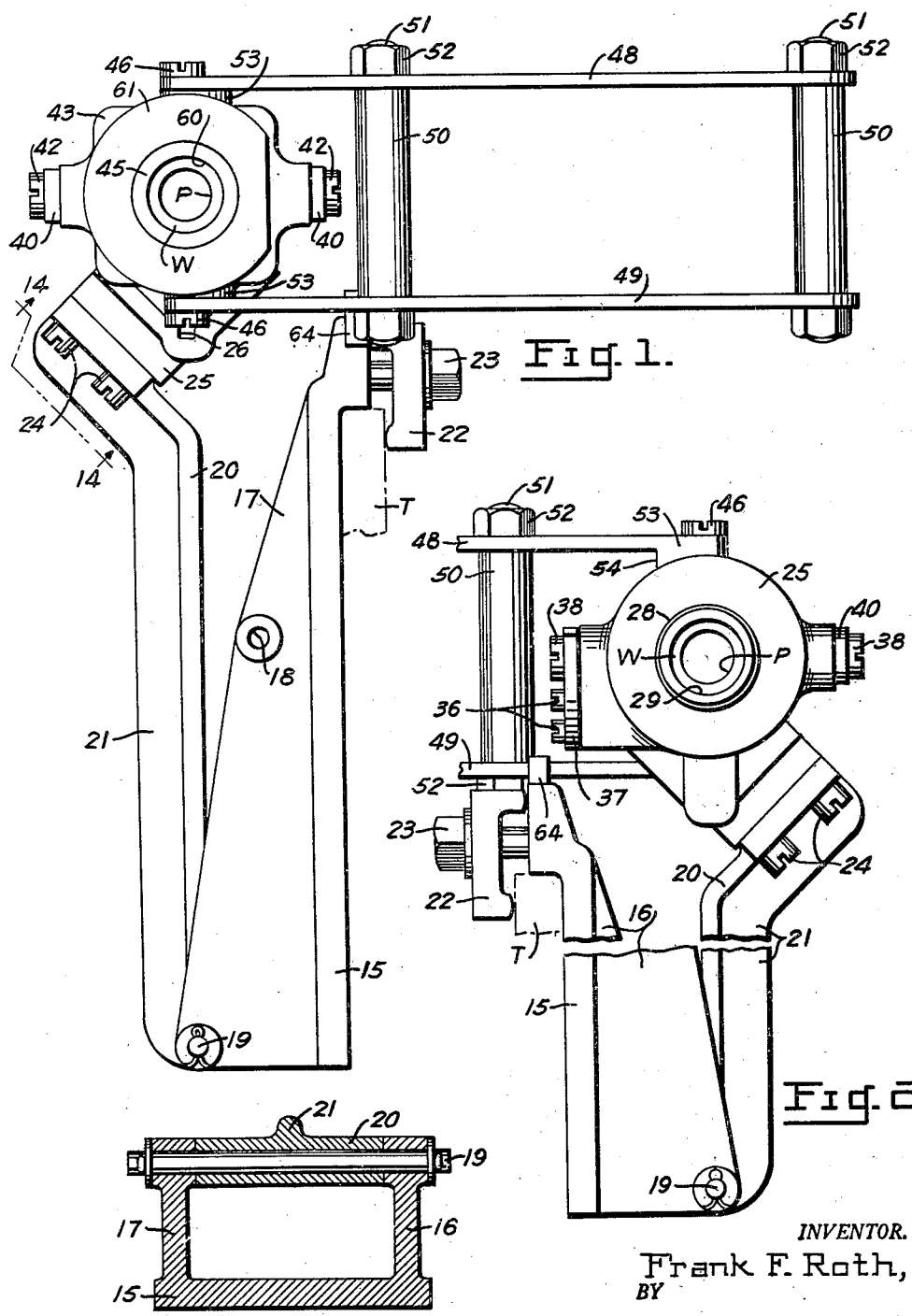

INVENTOR.
Frank F. Roth, Jr.
BY
ATTORNEYS

Jan. 18, 1949. F. F. ROTH, JR 2,459,183
FIXTURE FOR HARDENING DIES
Filed Oct. 1, 1946 5 Sheets-Sheet 3
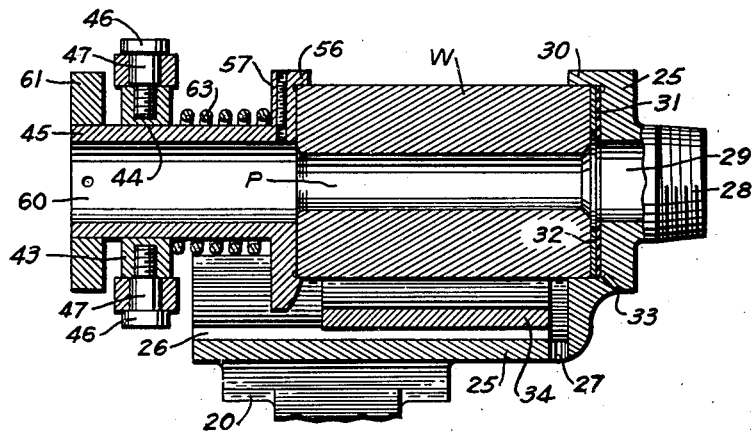
Fig. 12.
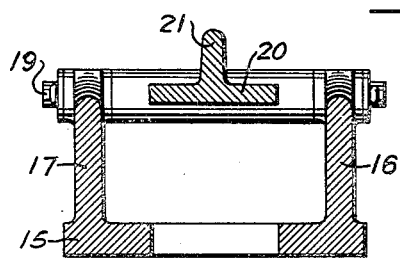
Fig. 13.
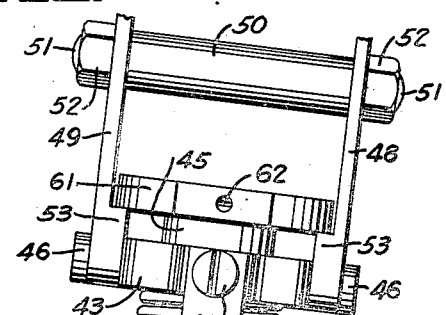
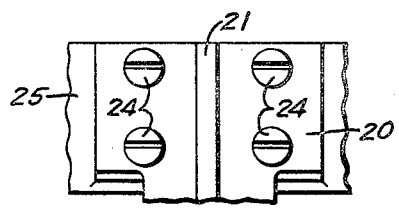
Fig. 14.
Fig. 5A.
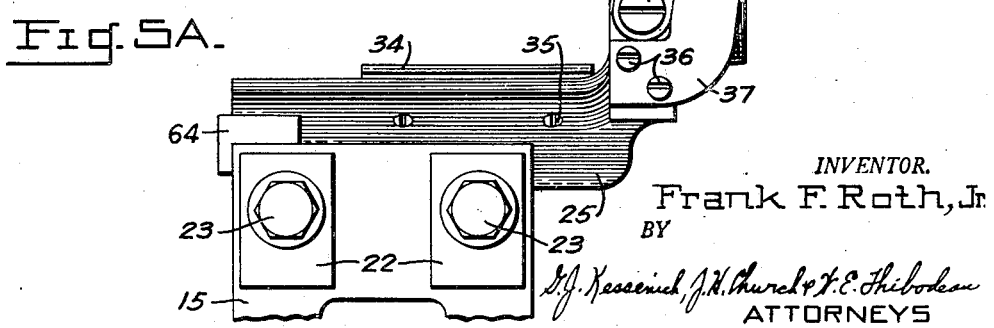
INVENTOR.
Frank F. Roth, Jr.
BY
ATTORNEYS Jan. 18, 1949.  F. F. ROTH, JR  2,459,183
FIXTURE FOR HARDENING DIES
Filed Oct. 1, 1946  5 Sheets-Sheet 4
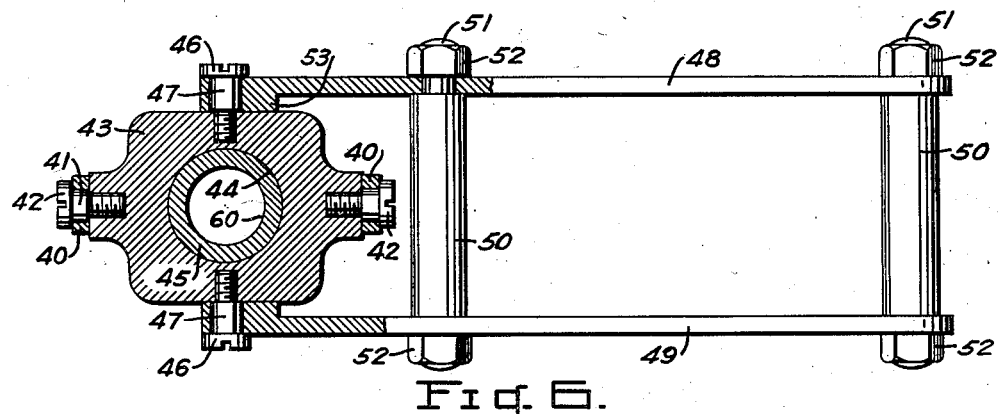
Fig. 6.
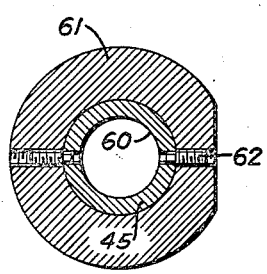
Fig. 7.
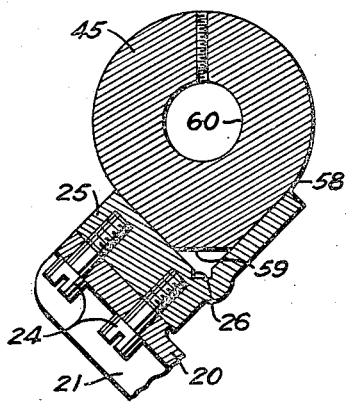
Fig. 8.
Fig. 9.
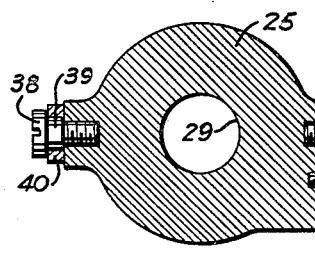
Fig. 10.
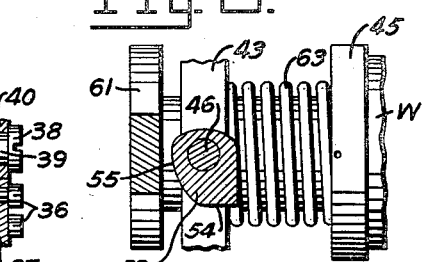
Fig. 11.  Fig. 11A.
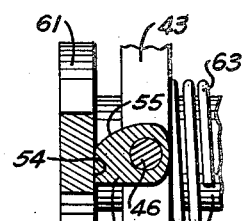
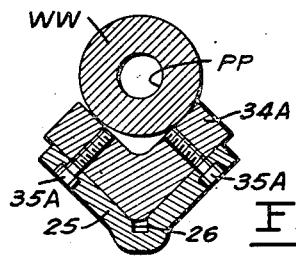
Fig. 9A.
INVENTOR.
Frank F. Roth, Jr.
BY
ATTORNEYS.

INVENTOR.
Frank F. Roth, Jr.
BY
ATTORNEYS.

Patented Jan. 18, 1949

2,459,183

UNITED STATES PATENT OFFICE 2,459,183

FIXTURE FOR HARDENING DIES

Frank F. Roth, Jr., Philadelphia, Pa.

Application October 1, 1946, Serial No. 700,539

1 Claim. (Cl. 134—105)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a fixture for hardening metal parts which have a cylindrical opening through them, such as dies for small arm cartridges or the like, by dipping the parts in and flowing through the opening in the parts a quenching fluid, such as water.

More specifically, this invention relates to a hardening and quenching fixture having means for clamping therein a perforated workpiece to be hardened, said means being pivotally mounted and connected to a handle so that the workpiece can be dipped in a tank of hardening liquid while at the same time the hardening liquid is fed through a perforation in the workpiece.

It is an object of this invention to provide a hardening fixture which has the following advantages among others. The hardening fixture can be operated by unskilled labor and gives 100% uniform hardening. The hardening fixture, being pivotally mounted on a fixed support, is much safer than the manually operated and supported tongs heretofore used. It is much healthier to operate the hardening fixture of this invention because fatigue of the operator is lessened since the part need not be supported by the operator and since there is no necessity for the operator to dip his hands in the water or hardening liquid.

Other objects and advantages of this invention will be readily apparent or may be learned from annexed drawings and specification to which reference is here made for a clear and concise description of this invention.

In the accompanying drawings:

Fig. 1 is an end elevation of the hardening fixture of this invention.

Fig. 2 is an elevational view of the opposite end of the hardening fixture with parts broken away horizontally.

Fig. 3 is a horizontal cross section on line 3—3 of Fig. 5.

Fig. 5A (Sheet 4) is a front elevation of the hardening fixture, the handle and slidable body being raised, ready to receive a workpiece therein.

Fig. 6 is a vertical transverse cross section on line 6—6 of Fig. 5.

Fig. 7 is a vertical transverse cross section on line 7—7 of Fig. 5.

Fig. 8 is a vertical transverse cross section on line 8—8 of Fig. 5.

Fig. 9 is a vertical transverse cross section on line 9—9 of Fig. 5.

Fig. 9A is a vertical transverse cross section similar to Fig. 9 showing a workpiece and support therefor of different size.

Fig. 10 is a vertical transverse cross section on line 10—10 of Fig. 5.

Fig. 11 is a horizontal transverse cross section on line 11—11 of Fig. 5 viewed in the direction of the arrows.

Fig. 11A is a horizontal transverse cross section similar to Fig. 11 showing some of the parts in a different position.

Fig. 12 is a vertical longitudinal cross section on line 12—12 of Fig. 4.

Fig. 13 is a horizontal cross section on line 13—13 of Fig. 5.

Fig. 14 is an oblique elevation as seen from line 14—14 of Fig. 1.

Figure 4:
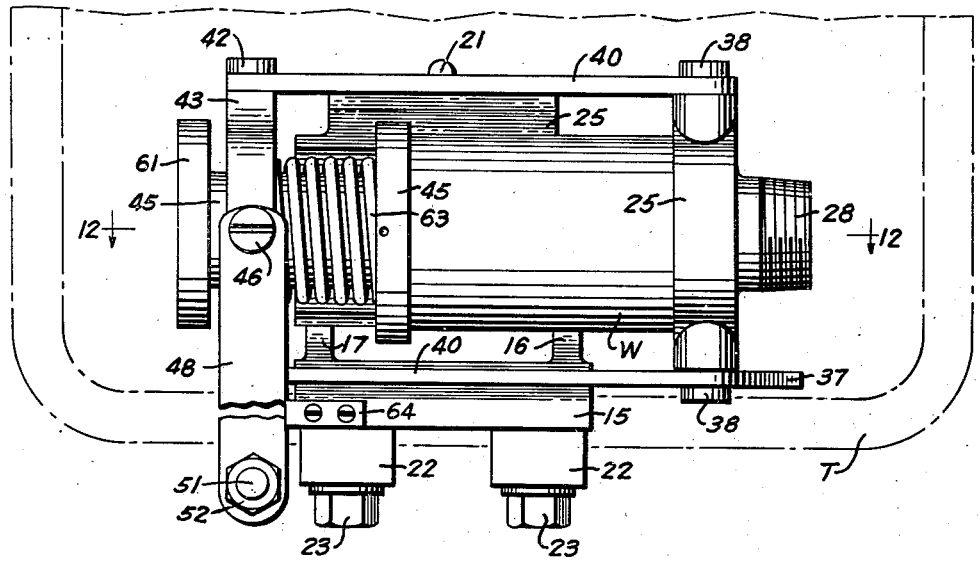
Fig. 4 is a top or plan view of the hardening fixture showing the tank, with which it is used, in dotted and dashed lines and with the handle broken away vertically intermediate its ends.

One embodiment of this hardening fixture is as follows. On the tank T, or like container for quenching and cooling liquids such as water, is mounted a support 15 having rearwardly projecting sides 16 and 17 so that the support is substantially C-shaped in horizontal cross section, as is seen in Figs. 3 and 13. Through the sides 16 and 17 pass an upper pair of holes 18 and a lower pair of holes (unnumbered) in which is secured a pin 19. A pair of clamps 22 are secured by headed screws 23 to the upper end of support 15 so as to mount the support firmly on the rim of the tank T.

Pin 19 passes through a hole in the lower end of a link 20 which has on its rear face a stiffening rib 21 so that the link 20 is substantially T-shaped in horizontal cross section (Figs. 3 and 13). Fig. 14 shows that four screws 24 pass through the upper end of link 20 and fasten a body 25 securely on the upper or free end of link 20. Fig. 8 shows that body 25 is substantially V-shaped in vertical transverse cross section and has a drainage channel 26 in the bottom thereof. Fig. 12 shows that drainage channel 26 communicates at its right-hand end with an outlet drain 27 and that the right-hand end of body 25 has a tapered screw-threaded hose connection 28 surrounding a perforation 29 through the body 25. A flange 30 projects from the inner vertical face of the body 25 against which is placed a perforated resilient gasket 31 of rubber or like yielding material. Against gasket 31 is placed a perforated adjusting ring 32 arranged to be located between the gasket 31 and the die or workpiece W which is to be quenched and hardened. The perforation 29, the opening in gasket 31, the opening in ring 32 and the perforation P (passing through the workpiece W) are all aligned and in communication with one another. A plurality of drains 33, of which but one appears in the drawings, pass through body 25 adjacent the lowermost part of the edge of gasket 31.

Fig. 9 shows that body 25 may, if desired, have a V-shaped supporting block 34 secured to it by means of screws 35 for example. Fig. 9A shows supporting block 34A secured to the body 25 by means of elongated screws 35A. Supporting block 34A is much thicker than supporting block 34 so as to support workpiece WW which is much smaller in diameter than workpiece W so that the perforation P in the workpiece WW is properly aligned with the perforation or inlet opening 29 in the body 25.

Figure 5:
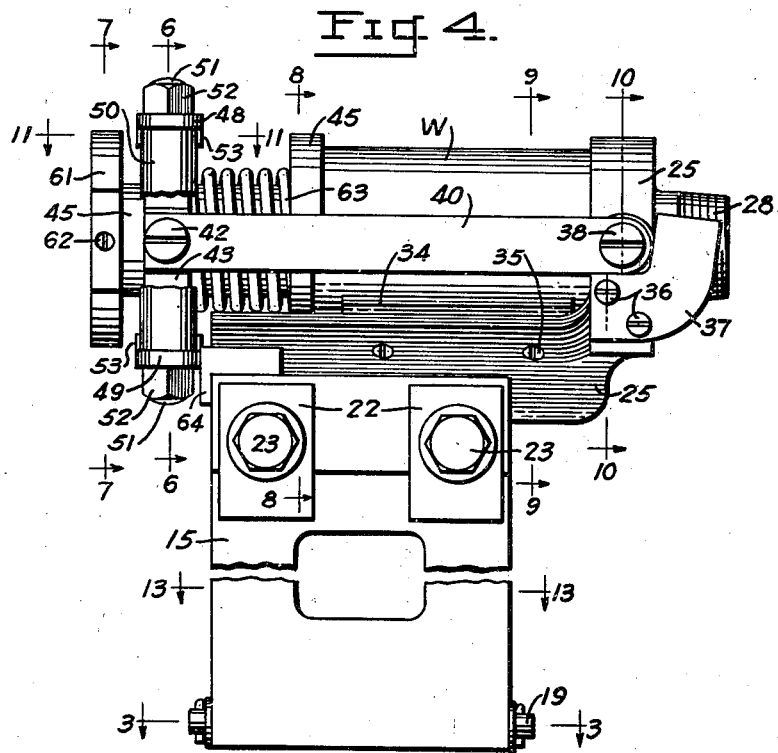
Fig. 5 is a front elevation with parts broken away horizontally for clarity.

Figs. 5 and 10 show that body 25 has secured to it by means of screws 36 an L-shaped stop 37. These figures also show that the body 25 carries link-pivot screws 38 which are tapped into the body 25. Each screw has an intermediate cylindrical portion 39 upon which rotates one end of one of a pair of links 40. The opposite ends of links 40 ride on the intermediate cylindrical portion 41 of one of a pair of link-securing screws 42 whose inner ends have screw-threaded engagement with a link support 43 having an opening 44 passing through it in which is slidably mounted a movable body 45. The upper and lower faces of link support 43 have screw-threaded openings in them into each of which fit the inner screw-threaded end of one of a pair of handle-securing screws 46 each provided with an intermediate cylindrical portion 47 upon which are journaled the rear ends of a pair of bars 48 and 49 which form the upper and lower sides of a handle. A pair of tubes 50 form the vertical pieces of the handle each being secured in position by a headless bolt 51 held onto the bars 48 and 49 by means of nuts 52. Figs. 6, 11 and 11A show that the inner end of bar 48 has a cam 53 on it. Bar 49 has on it a similar cam (not numbered). Cam 53 is provided with a flat cam face 54 and a curved cam face 55.

Figs. 4, 5, 5A and 12 show that movable body 45 has, at its inner or right-hand end confronting the perforated left-hand face of body 25, an enlarged face provided with a flange 56 at the upper portion thereof. Fig. 8 shows that movable body 45 has at the lower end of its enlarged portion 57 two flat faces 58 which are tangential to the outer cylindrical surface of the body 45 and which are adapted to ride on the flat inner surfaces of the V-shaped portion of body 25. Between the flat tangential faces 58, the enlarged portion 57 of body 45 has a flat bottom face 59 providing a drainage space above the drainage channel 26. An axial perforation 60 passes longitudinally through movable body 45 and communicates with the perforation P in the workpiece W. At the outer or left-hand end of movable body 45, a flat ring-shaped spring retainer 61 is connected to the movable body 45 by means of set screws 62 (Figs. 5 and 7). A coil spring 63 is interposed between the link support 43 and the enlarged portion 57 of movable body 45 and stresses the movable body 45 towards the confronting face of body 25. Support 15 has a stop 64 on it which engages the handle to limit its travel in one direction.

The operation of the hardening fixture of this invention is as follows:

A hose is connected to hose connection 28 so as to conduct water to the perforation 29, the supply of water being controlled by a valve (not shown). The tank T is filled with water to a desired level. Depending upon the size of the operator, the pin 19 is passed through the lower holes in the walls 16 and 17 (as shown) or is passed through the holes 18. This varies the pivot about which rotate link 20 and all the other parts of the hardening fixture which are supported by link 20. Fig. 5A shows the hardening fixture in the starting position. The abutment of the top edge of one of the links 40 against the vertical face of the L-shaped stop 37 limits the amount of turning movement of the parts in a clockwise direction, as is seen in Fig. 5A. The handle and its associated parts are turned counterclockwise until they assume a horizontal position, in which they are seen in Fig. 5. The handle is then moved to the right. Figs. 11 and 11A show that this right-ward turning movement of the handle removes the flat cam face 54 from engagement with the spring retainer 61 and allows the flat face of the spring retainer 61 to engage with the curved cam face 55 of the cam 53 and allows the spring 63 to expand, carrying with it the movable body 45. This movement of movable body 45 continues until its enlarged end 57 engages with the end of the work-piece W so that the spring 63 holds the workpiece W in firm but yielding engagement between the confronting faces of the movable body 45 and the body 25. The handle may be then pushed away from the operator about the pin 19 as a pivot so that the link 20 and all the parts supported by it turn in a counter-clockwise direction as seen in Fig. 1, the turning movement being shown in Fig. 1 as having already commenced. When the perforation 60 overlies the tank T, the valve (not shown) is turned on so that the quenching and hardening liquid flows through the perforation 29 in the hose 28, the perforation through gasket 31, through adjusting ring 32, the central perforation P in the workpiece W, and out through the perforation 60 in the movable body 45. The discharge of this liquid is caught in the tank T. At the same time, or as desired, the turning movement of the parts about the pin 19 as a pivot may be continued until the free end of the link 20 and the workpiece W carried thereby are dipped into the hardening liquid in the tank T. When the quenching and hardening of the workpiece W, due to its emersion in the hardening liquid in the tank T, has continued for the desired period of time, the handle is pulled toward the operator or in a clockwise direction as seen in Fig. 1. This lifts the workpiece W out of the hardening and quenching liquid and raises it up until the link 20 engages support 15 and limits further lifting movement. The handle is then moved to the left so that the curved cam face 55 of the cam 53 engages the inner flat face of the spring retainer 61. Continued turning movement of the handle compresses the spring 63 until the flat cam face 54 of the cam 53 engages the flat inner face of the spring retainer 61 and latches the spring 63 in compressed position. This compression of spring 63 removes the enlarged head 57 of the movable body 45 from the workpiece W. The handle may then be turned clockwise, as seen in Fig. 5A, leaving the workpiece W resting on the V-shaped support block 34. The hardened and quenched workpiece W can then be removed from the V-shaped supporting block 34 and a fresh, heated workpiece W be placed on the V-shaped supporting block 34 for quenching and hardening by a repetition of the foregoing sequence of steps.

A thicker V-shaped supporting block 34A may be secured to the body 25 by means of elongated screws 35A in place of the V-shaped supporting block 34. This choice of a V-shaped supporting block to suit the size of the workpiece undergoing treatment insures that the perforation P in the workpiece is properly aligned with the inlet perforation 29 so that quenching fluid can flow through the hole in the workpiece.

Figure 12A:
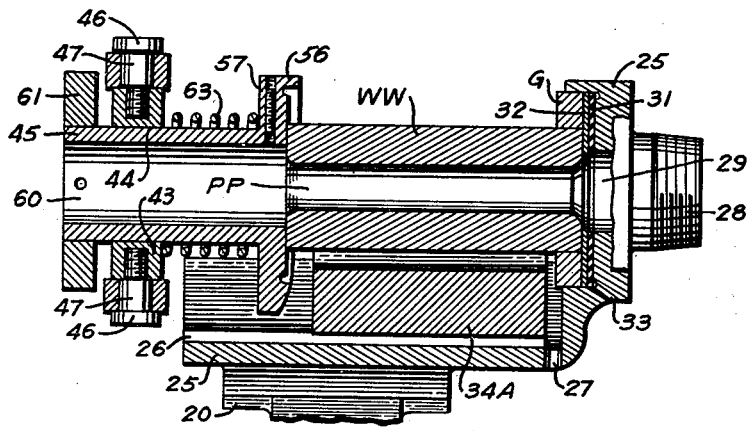
Fig. 12A (Sheet 5) is a vertical longitudinal cross section similar to Fig. 12 showing a workpiece of smaller diameter.

Fig. 12A shows that when a V-shaped supporting block 34A of increased thickness is used to support a workpiece WW of reduced diameter, a gasket G can be employed surrounding the right-hand end of the workpiece WW which abuts adjusting ring 32 so as to insure a tight seal around the workpiece WW and prevent the escape of quenching liquid flowing from the inlet perforation 29 through the perforation PP in the workpiece WW.

Figure 12B:
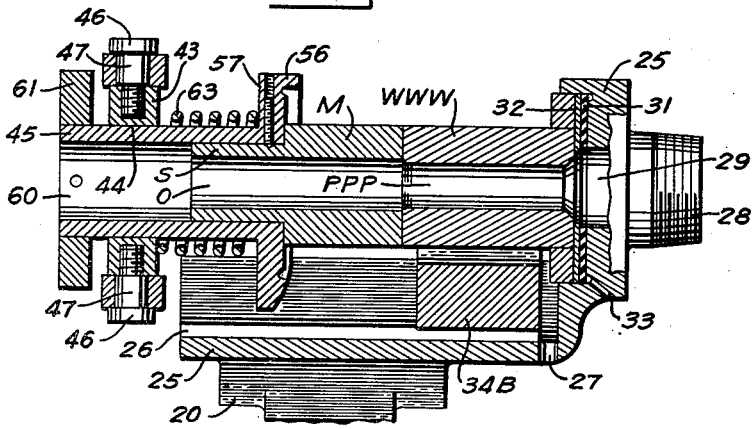
Fig. 12B (Sheet 5) is a vertical longitudinal cross section similar to Fig. 12 showing a workpiece shorter in length and smaller in diameter.
Figure 15:
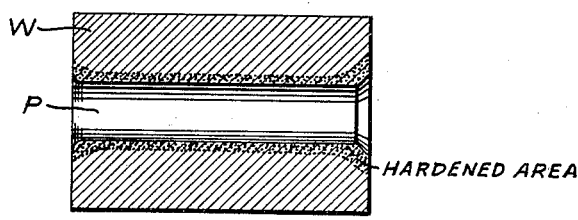
Fig. 15 is an elevational view showing a workpiece hardened in the fixture of this invention, cut in half, etched, and polished to render the hardened area visible to the naked eye.

Fig. 12B shows that, when a workpiece WWW is to be quenched and hardened which is both of smaller diameter and of short length, a perforated fitting M having one outside diameter of reduced size (as shown at S) can be mounted in the movable body 45 to take up the space between the enlarged end 57 of the movable body 45 and the confronting face of the body 25. Fixture M holds the workpiece WWW firmly in the desired position. Fixture M has an opening O axially through it communicating at one end with the perforation PPP within the workpiece WWW and at the other end with the outlet opening 60 in the movable body 45.

I claim:

For heat treating and hardening perforated metal parts such as dies and similar articles by dipping them in a quenching liquid and by flowing the quenching liquid through the perforations in the metal parts, a fixture including, a support mounting the fixture adjacent a tank containing a quenching liquid, a link pivoted on said support and having a portion spaced from said pivot and rotatable about said pivot so as to be dipped into or be lifted out of the quenching liquid, a first body mounted on said rotatable portion of said link and having a perforated part for engagement with one end of the die so that the perforations in the die and said first body communicate, a movable body slidable on said first body and having a perforated part for engagement with the other end of the die so that the perforations in the die and in the movable body communicate when the part to be quenched and hardened is secured between the confronting portions of said bodies, means including a hose connected to one of said bodies for use in conveying the quenching liquid through the perforations in that body, through the perforations in the part being heat treated and out through the perforations in the other of said bodies, a spring stressing said movable body toward the confronting portion of said first body, a handle pivotally mounted so as to move said link about its pivot for dipping the part carried between said bodies into the quenching and hardening liquid, and a cam located between said handle and said movable body and arranged upon another movement of said handle to compress or release said spring so as to clamp or unclamp said part between the confronting portion of said bodies.

FRANK F. ROTH, Jr.

REFERENCES CITED

The following references are of record in the file of this patent:

UNITED STATES PATENTS

| Number | Name | Date |
| --- | --- | --- |
| 65,598 | Piper | June 11, 1867 |
| 268,164 | Woodruff et al. | Nov. 28, 1882 |
| 1,327,443 | Olson | Jan. 6, 1920 |
| 1,513,974 | Ehn | Nov. 4, 1924 |
| 2,141,081 | Davenport | Dec. 20, 1938 |

FOREIGN PATENTS

| Number | Country | Date |
| --- | --- | --- |
| 38,338 | Germany | Mar. 4, 1887 |
| 43,565 | Germany | July 6, 1888 |